United States Patent Office 3,098,855
Patented July 23, 1963

3,098,855
PROCESS FOR SEPARATING BENZENE
CARBOXYLIC ACIDS
Alistair S. Couper and Charles D. Kalfadelis, Hammond, Ind., assignors to Standard Oil Company, Chicago, Ill., a corporation of Indiana
No Drawing. Filed Apr. 17, 1959, Ser. No. 807,017
7 Claims. (Cl. 260—525)

This invention relates to the separation of mixed aromatic acids. More particularly, it concerns an improved process for extracting benzoic and/or orthophthalic acid from isophthalic and/or terephthalic acids.

Mixtures of the three isomeric phthalic acids—ortho-, iso-, and tere-phthalic—with benzoic acid are commonly encountered in the commercial preparation of such acids by the oxidation of mixtures containing the corresponding alkyl-substituted aromatic hydrocarbons. Since the foregoing aromatic acids are chiefly required in isomerically pure form, it is necessary to resolve such mixtures. Numerous chemical and physical techniques are known for resolving mixed aromatic acids, and one of the most useful comprises the step of merely extracting the more soluble benzoic and/or orthophthalic acid from the substantially less soluble isophthalic and/or terephthalic acid with a suitable inert solvent such as water, acetic acid, or a xylene. While in theory this is readily accomplished, in practice it is found that the rates of physically separating the isophthalic-terephthalic acid raffinate from the benzoic-orthophthalic acid extract are extremely slow. These rates are so low as to require inordinately large extraction systems in high-throughput aromatic acid plants.

The problem of slow separation rates appears to be due to unfavorable crystal configuration. Where a finely divided and slightly soluble crystalline solid such as an aromatic acid is to be separated from a suspension liquid by physical separation techniques such as filtration, centrifugation, gravity settling, hydrocyclone separation or the like, both the size and the size distribution of the crystals are major factors in determining the rate at which such separation can be effected. If the crystals or particles are relatively homogeneous, i.e. are of approximately identical size, the separation rate is limited only by particle size and increases with larger particles. But where the particles are heterogeneous, i.e. have a broad size distribution, the crystals tend to pack tightly together and form an almost impermeable cake through which liquid is unable to drain.

A method has now been discovered whereby benzoic and/or orthophthalic acids (hereinafter sometimes referred to as members of group "A") may be extracted from an admixture with isophthalic and/or terephthalic acid (hereafter sometimes referred to as members of group "B"), and the raffinate of insoluble isophthalic and/or terephthalic acid may be separated from the resultant suspension or slurry at rates of from four to ten or more times faster than are otherwise obtainable. Specifically, it has now been discovered that heterogeneous sized crystals of isophthalic or terephthalic acids may be separated from suspension liquids (containing the extracted benzoic and isophthalic acids) at markedly increased rates if these solid acids are first "preconditioned" by heating the suspension or slurry to a sufficient temperature to dissolve at least about five times the amount of the solid acid that will dissolve at the subsequent physical separation temperature, but not, by any means, to dissolve all of the acid, and thereafter slowly cooling the solution in intimate contact with the undissolved solid acid crystals to deposit or recrystallize the dissolved isophthalic and terephthalic acids on crystals already present. Nucleation, the formation of new crystal nuclei, is substantially avoided by cooling at a slow rate, e.g. 0.05–5.0° F. per minute.

The net effect is the dissolving of a substantial amount of the tiny isophthalic or terephthalic acid crystals which can pass through a 325 mesh (U.S. standard) screen and recrystallizing the dissolved portion on other crystals, thereby increasing the average crystal size and forming a more homogeneous crystalline mass which is readily separable from the liquid. After preconditioning, a solids-enriched fraction may be separated by any conventional physical separation technique such as filtration, centrifugation, gravity settling, hydrocyclones, etc. The substantial reduction in the amount of sub-325 mesh crystals in the slurry increases the rate at which physical separation may be accomplished by preventing the crystals from packing and hence permitting the liquid extract containing benzoic and/or orthophthalic acids to pass through a compacted mass of crystals with reduced frictional resistance.

Aside from providing more rapid rates of aromatic acid separation, the step of preconditioning the crystals by dissolving sub-325 mesh crystals and redepositing the dissolved material on other crystals offers several important advantages in extraction operations. For one illustration, when orthophthalic acid is extracted from a mixture of isomeric phthalic acids with an aqueous solvent, the insertion of a preconditioning step prior to separation of the isophthalic-terephthalic solids from the orthophthalic-rich extract results in retaining less residual orthophthalic acid in the solids. Also, the solids exhibit less tendency to occlude water, and can be obtained from a separation apparatus as a cake usually containing less than one-third the amount of water than is the case when preconditioning is omitted. Of major practical importance is the fact that thick slurries of aromatic acid crystals, after preconditioning, do not display the adhesiveness to metals that slurries of heterogeneous sized aromatic acids show. In addition, the isophthalic-terephthalic solids, when dried, are recovered as a free flowing crystalline material which is readily handled without bridging or excessive dust loss.

In practicing the present invention, a mixture of the aforesaid aromatic acids is commingled with a suitable substantially-inert solvent in sufficient amount to dissolve all of the benzoic or orthophthalic acids at the subsequent physical separation temperature, and the slurry is heated at any convenient rate to a preconditioning temperature which is sufficient to dissolve from about five to about one hundred or more times (optimally from about seven to about thirty times) as much of the relatively insoluble isophthalic-terephthalic fraction as is dissolved at the temperature at which separation is to be effected. Manifestly, the heating temperature should not be so high as to dissolve all of the crystals. Agitation or recirculation of the suspension or slurry is advantageously applied during this period to facilitate the approach to equilibrium concentration of the acids in solution. Upon reaching the desired high temperature, the solution may be maintained at this temperature for a short period to insure adequate solution of the sub-325 mesh crystals; the holding time may be from fifteen minutes to three hours or more.

Following the heating of the slurry to high temperature—and optional holding at this temperature—the slurry is cooled gradually so as to deposit the acids previously dissolved on the surfaces of larger size crystals present in the slurry, and at the same time to avoid the substantial formation of any new nuclei or crystals. Controlled cooling may be obtained by regulating the cooling rate within the range of from about 0.05 to 5.0, more preferably 0.5 to 5.0 degrees F., per minute and thereby avoid shock-chilling the slurry. For optimum benefits, cooling is best accomplished in a vacuum crystallizer rather than by means of cooling coils or jackets, although coils or jackets may, as will appear hereinafter, be employed. This slow cooling, coupled with the maintenance of intimate contact between the liquid and solid crystalline particles, assures that submicroscopic aromatic acid aggregates which form on cooling will be attracted to crystals already present, rather than coalesce and form new crystal nuclei or larger particles and thereby cause a regression in crystal size distribution.

Naturally, the optimum cooling rate varies somewhat with different solvents and with different compositions of aromatic acids. While the inventive process is of applicability with virtually any mixture of benzoic and/or orthophthalic acid with isophthalic and/or terephthalic acid, it finds particular utility with mixtures of aromatic acids which are derived from mixed petroleum xylenes. Such aromatic acid mixtures may contain 0–30% benzoic acid, 0–50% ortho-phthalic acid, and 0–50% each of isophthalic and terephthalic acid. In any particular instance, a solvent cooling rate is best determined experimentally in the laboratory or pilot plant which will provide a sufficient improvement in filtration rate or centrifugation drain rate with the solvent and aromatic acid in question, yet which will not require an inordinately long preconditioning time. When the optimum cooling rate is determined for one separation method this generally will serve for other techniques. For example, a simple laboratory vacuum filter of the Buchner type is suitable for estimating relative improvement at a given set of crystal preconditioning conditions which will be realized in a plant scale vacuum or pressure filter, centrifugal separator, liquid cyclone or like apparatus.

A wide variety of substantially inert solvents may be employed in the inventive process. By the term "substantially inert," it is meant that the solvent should not react with aromatic acids (other than to hydrate phthalic anhydride to orthophthalic acid) at preconditioning and separation temperatures. Thus water may be used, and is in fact the preferred solvent. Lower saturated monocarboxylic acids having from one to about eight carbon atoms each, such as acetic acid; hydrocarbons, such as the aromatics illustrated by benzene or the xylenes, and the aliphatics such as $C_6$–$C_{10}$ paraffins; ethers such as diethyl ether; ketones such as methyl ethyl ketone or methyl isobutyl ketone; and other solvents may be employed.

It is preferred to commingle the aromatic acids with about from 5 to 500% excess of solvent, and preferably from 10 to 50% excess, over and above that necessary to dissolve substantially all of the soluble component at the temperature at which physical separation is to be effected. (Solubility data is readily available in the literature, or may be readily determined by experiment.) This has the advantage that at least enough solvent is available to take all of the soluble benzoic and/or orthophthalic acid into solution, thus saving on the cost of ultimately recovering the soluble acids, yet the amount of insoluble isophthalic or terephthalic acids concurrently dissolved is minimized. Where, for instance, orthophthalic acid is to be extracted from an orthophthalic-isophthalic-terephthalic acid mixture, the use of only a 10–50% excess of solvent is advantageous inasmuch as orthophthalic acid, the material to be extracted, is about nine or ten times as soluble as isophthalic acid, the next most soluble component, and excessive amounts of solvent would only result in additional contamination of the orthophthalic acid extract by isophthalic acid without providing a noticeable reduction in the amount of orthophthalic acid remaining in the raffinate.

Isomeric petroleum-derived phthalic acids were selected to demonstrate the advantages of the present invention since mixed phthalic acid mixtures of the type obtainable by the oxidation of petroleum xylenes are notoriously difficult to separate from solvents in which they are suspended. Filtration or centrifugation are generally not employed with these materials because the suspending medium must flow through a cake of acids, and interstices in the cake become rapidly plugged by tiny particles of acid still suspended in the liquid. Consequently, it has been found necessary to employ several stages of liquid cyclones, of the type known commercially as Dorrclones, where, instead of separating a solid phase from a liquid phase, there is obtained only a concentrated solid-enriched fraction or suspension as a final product. Moreover, with phthalic acids an anomalous behavior is observed in filtration or centrifugation; the liquid drain rate per unit area of filter cloth or basket area decreases rapidly with increasing slurry concentration, rather than being nearly independent of slurry concentration as is the case with most other crystalline materials.

PREPARATION OF MIXED AROMATIC ACIDS

As an example of the preparation of mixed aromatic acids, the production of isomeric phthalic acids by oxidation of mixed petroleum xylenes is illustrated. Although any feasible system for effecting the oxidation of xylenes to produce substantial yields of isomeric phthalic acids may be used, for the present purposes an oxidation is described utilizing the heavy metal plus bromine oxidation system described in Belgian Patent Number 546,191 of Mid-Century Corporation since this process has been demonstrated to have certain outstanding advantages for oxidation of mixed xylene feeds.

The feed comprises a mixture of meta-, para-, and ortho-xylenes in proportions of about 2:1:1. The feed also contains about 5% ethyl benzene. The feed is charged to a pressure and corrosion resistant oxidation reactor with about two hundred parts of acetic acid per one hundred parts of feed, and with two parts of manganese acetate and one part of tetra-bromoethane as catalyst. The oxidation is conducted by passing air into the reaction mixture at a rate sufficient to provide stoichiometric reaction in about thirty minutes. Reaction initiates at about 125° F., and thereafter the reaction is self-sustaining, with the temperature being maintained in the region of about 250 to 400° F. at a pressure of 300–400 p.s.i.g. After about thirty minutes the reaction is essentially complete and the reaction mixture is withdrawn, cooled to below about 140° F., and centrifuged. The crude phthalic acid cake is heated and dried with circulating flue gas to remove residual acetic acid.

*Filtration*

In three runs, the advantages of the present crystal preconditioning method of the invention were demonstrated by extracting orthophthalic acid from mixed phthalic acids with water, and filtering the isophthalic-terephthalic acid solids from the extract. The mixed phthalic acids were obtained as described immediately above and constituted a heterogeneous sized crystalline mass. Water was employed as the extractive solvent since orthophthalic acid is approximately nine or ten times as soluble in water as is isophthalic, and approximately one hundred times as soluble as terephthalic. In each run, the mixed aromatic acids were contacted with sufficient water to provide a 10% excess over the amount necessary to dissolve all of the orthophthalic acid at the 212° F. filtration temperature.

In run No. I, to illustrate the present invention, 150 pounds of mixed acids containing 51.9 weight percent orthophthalic acid, and 500 pounds of water were placed in a 100 gallon stainless steel autoclave provided with a high pressure steam jacket and rotary stirring means. With the stirrer operating, preconditioning was begun by heating the mixture of aromatic acids and water from 75° F. to about 330° F. in 45 minutes at autogenous pressure. At this temperature, orthophthalic acid is about 18 times as soluble while isophthalic and terephthalic acids are each about 14 times as soluble as at the 212° F. filtration temperature. It was held at 330°

F. with constant stirring for 30 minutes, and thereafter the autoclave pressure was reduced and the autoclave contents cooled by evaporation from a temperature of about 330° F. down to 212° F. at an even rate in 45 minutes. The condensate was collected and volume thereof was measured and found to comprise 30% of the initial water present; this amount of water was restored to the autoclave. The slurry of phthalic acids and water was kept under agitation for an additional 60 minutes at 212° F. to complete the solution of orthophthalic acid and then filtered in a vacuum filter employing 28 inches of mercury vacuum. A number 6 duck canvas filter cloth was used. The results of this operation are shown as run No. I in the table below.

A second test, run No. II, was conducted to demonstrate that preconditioning at a temperature where less than about 5 times the amount of acids will dissolve is ineffective. The low preconditioning temperature of 262° F. and the same 212° F. filtration temperature as employed for run No. I were used. At 262° F., isophthalic acid and terephthalic acid are each only approximately 3.1 times as soluble as at 212°. The operation was conducted by placing 150 pounds of the same aromatic acid mixture as in run No. I in a similar autoclave, and adding 500 pounds of water. The autoclave contents were heated from 75° F. to about 262° F. in 30 minutes, held at that temperature with constant stirring for 23 minutes, and cooled by water evaporation to a temperature of 212° F. at an even rate in an additional 43 minute period. Upon measuring the evaporator condensate, it was found that 7% of the water had evaporated, and this quantity was restored to the autoclave. After holding the contents at 212° F. for 50 minutes, filtration was commenced in a vacuum filter with 28 inch mercury vacuum. Results of this operation are shown as run No. II in the table below.

A third run, designated run No. III, was performed to illustrate the conventional manner of extracting orthophthalic acid from an orthophthalic-isophthalic-terephthalic acid mixture. This mixture however was prepared from a different xylene fraction and contained only 39.0 weight percent orthophthalic acid, and accordingly the amount of water required for the 150 pounds of acid was reduced to 400 pounds so as to maintain the same 10% excess of solvent. Since no pretreating was employed, the autoclave contents were heated to 212° F. in 55 minutes, and with constant stirring held at that temperature for one hour and then filtered at 28 inch mercury vacuum in the vacuum filter. The results are contrasted with the previous runs in the table immediately below.

*Table I*

FILTRATION OF ISOPHTHALIC-TEREPHTHALIC ACID SOLIDS FROM AQUEOUS ORTHOPHTHALIC ACID SOLUTION

| Run No. | I | II | III |
|---|---|---|---|
| Extraction Temperature, °F | 330 | 262 | 212 |
| Filtration Temperature, °F | 212 | 212 | 212 |
| Filtration Time, Min | 45 | 180 | 195 |
| Feed Acid Analysis: | | | |
| Orthophthalic, Wt. Percent | 51.9 | 51.9 | 39.0 |
| Isophthalic | 28.9 | 28.9 | 39.3 |
| Terephthalic | 22.6 | 22.6 | 24.2 |
| Filter Cake Analysis: | | | |
| Orthophthalic, Wt. Percent | 2.3 | 3.5 | 2.8 |
| Isophthalic | 62.5 | 63.2 | 67.9 |
| Terephthalic | 37.8 | 36.4 | 32.5 |
| Particle Size, Wt. Percent on Screen: | | | |
| 35 Mesh | 10.8 | 0.9 | 0 |
| 48 | 3.1 | 0.9 | 0.5 |
| 65 | 4.6 | 1.9 | 1.1 |
| 80 | 4.6 | 0 | 1.1 |
| 100 | 6.2 | 1.9 | 1.1 |
| 150 | 18.5 | 3.7 | 4.8 |
| 200 | 12.3 | 3.7 | 4.8 |
| 250 | 9.2 | 3.7 | 4.3 |
| 325 | 6.2 | 5.6 | 8.0 |
| Filter Paper | 24.6 | 77.7 | 74.4 |
| Extract Analysis: | | | |
| Orthophthalic, Wt. Percent | 93.7 | 94.5 | |
| Isophthalic | 5.2 | 3.1 | |
| Terephthalic | 2.9 | 2.3 | |

From an inspection of the above table the marked improvements attained with the instant process are immediately apparent. While conventional operations or low temperature preconditioning require at least 180 minutes to achieve filtration, preconditioning at 330° F. provides a crystal size distribution requiring only 45 minutes for complete filtration. Thus 330° F. preconditioning reduces filtration time by 77%.

By wet screen analysis, the particle size distributions for all three filter cakes were determined and the results shown in the above Table I. The conventional method of extraction where no crystal preconditioning was employed gave a filter cake composed of substantially no particles caught on a 35 mesh screen, and 74.4 weight percent of the cake could pass through a 325 mesh screen. Preconditioning at 262° F. provided a slight, hardly noticeable improvement in particle size distribution. The contrast between 330° F. preconditioning of run I using the present invention (14:1 solubility ratio) with the 262° F. preconditioning of run No. III (3.1:1 solubility ratio) is at once apparent. While a non-preconditioning operation gave no particles caught on the 35 mesh screen, 262° F. preconditioning gave 0.9% and 330° F. preconditioning provided 10.8 weight percent of the crystals having 35 or larger mesh size. In the sub-325 mesh particle size range, only 24.6 weight percent was obtained in the 330° F. preconditioning operation while more than 70% was obtained with no preconditioning.

CENTRIFUGAL SEPARATION

In two additional runs, orthophthalic acid was extracted from an orthophthalic-isophthalic-terephthalic acid mixture with water by means of a centrifugal separator. The centrifuge employed was a Baker-Perkins horizontally-mounted basket centrifuge having a basket 45 centimeters (about 18 inches) in diameter. The screen was composed of 20 by 500 by 58 micron Dutch weave stainless steel screen. This centrifuge gave a force of 450 gravities (G's) at 1338 r.p.m., and 1000 G's at 1996 r.p.m., the gravity varying with the square of the speed.

Crystal preconditioning was employed in run IV by placing 134 pounds of mixed phthalic acids and 492.0 pounds of water in a stirred steam-heated pressure autoclave. The temperature was raised from 75° F. to 300° F. in 75 minutes, with constant stirring to assure homogeneity of the slurry. At 300° F., isophthalic and terephthalic acids are each about 7.1 times as soluble than at 212° F. The contents were held at 300° F. at a maximum pressure of 50 p.s.i.g. for an additional 45 minutes, and then heating was discontinued and cooling commenced by the injection of water into the steam jacket. The contents were cooled gradually to 261° F. in 15 minutes, 255° in 30 minutes, 236° in 45 minutes, 218° in 60 minutes, and 206° after 80 minutes of total cooling. The slurry contained 16.4 weight percent solids measured at 212° F.

The autoclave contents were centrifuged through the Baker-Perkins apparatus described earlier, which had previously been prepared for use by depositing about a one-fourth inch heel of isophthalic-terephthalic acid in the basket. Centrifugation was commenced at 212° F. and at a speed corresponding to 600 G's, but mother liquor separation was so rapid that the basket could not be supplied with magma at a sufficiently rapid rate to provide a uniform cake, and excessive vibration ensued. The centrifuge was thereupon slowed down to provide a maximum of 450 G's, at which condition separation was completed.

In run V, an identical 16.4 weight percent slurry was prepared from the original aromatic acid mixture without crystal preconditioning. Centrifugation was effected at 600 G's despite repeated plugging of the product chute. The original slurry, as well as the product, adhered tenaciously to metallic surfaces. The results of the centrifugation are shown below.

Table II

CENTRIFUGATION OF ISOPHTHALIC-TEREPHTHALIC ACID SOLIDS FROM AQUEOUS ORTHOPHTHALIC ACID SOLUTION

| Run No | IV | V |
|---|---|---|
| Extraction Temperature, °F | 300 | 210 |
| Centrifuge Temperature, °F | 210 | 210 |
| Centrifuge Drain Rate, Lb./Min.-Ft.$^2$ | 46.8 | 6.5 |
| Slurry Concentration, Wt. Percent Solids at 212° F | 16.4 | 16.4 |
| Centrifuge Cycle, Seconds: | | (*) |
| Charging | 30 | 45 |
| Spin | 70 | 120 |
| Water Wash | 5 | 5 |
| Spin Dry | 50 | 120 |
| Centrifuge Splash, Wt. Percent of Mother Liquor | 5.4 | 24.6 |
| Water Wash, # Water/# Wet Cake | 0.35 | 0.57 |
| Product Cake Analysis, Wt. Percent on Solids: | | |
| Moisture | 10.6 | 28.7 |
| Orthophthalic Acid | 0.26 | 0.10 |

*Product chute plugged repeatedly.

It will be observed that the centrifuge drain rate with the conventional operation of run V was only 6.5 pounds per minute (per square foot of basket area) at 600 G's, while the drain rate with preconditioned solids was 46.8 pounds per minute at the reduced force of 450 G's. The difference therefore is an improvement by a factor of at least 7.2 times.

Moreover, although the non-preconditioned solids were spin-dried for 120 seconds, the moisture remaining on the solids was 28.7 weight percent while with preconditioned solids and only 50 seconds of spin drying, the solids contained only one-third this amount of water.

From the foregoing discussion and illustrative examples it is manifest that physical separation techniques for removing a solid or solid-enriched crystalline aromatic acid from a suspension thereof in a liquid are vastly improved when employing the preconditioning process of the instant invention. By the simple technique of heating the suspension or slurry so as to dissolve the smaller crystals and then cooling the liquid under controlled conditions so as to deposit the dissolved material on larger size crystals still in suspension, the size of the latter are further increased while the formation of new tiny crystals is substantially avoided. As a consequence, the preconditioned solids have an average size distribution tending toward particles of larger size. Hence the solids—being larger and more nearly of homogeneous particles size—may be separated from the mother liquor at rates from four to ten or more times faster than heretofore obtainable under identical conditions. Preconditioned crystals are free flowing and offer substantially improved ease of handling, both wet and dry, over conventionally separated heterogeneous aromatic acids. While the improved process has been particularly exemplified with respect to the water extraction of orthophthalic acid from a mixture of isomeric phthalic acids, it is manifest that the improved process is eminently suitable for adaptation to any solvent-aromatic acid system.

Throughout the specification and claims, the term orthophthalic acid is intended to apply equally to phthalic anhydride.

Having described the invention, what is claimed is:

1. A process for separating "A" from "B", wherein "A" is a member of the group consisting of benzoic acid and orthophthalic acid and "B" is a member of the group consisting of isophthalic acid and terephthalic acid, and wherein "A" and "B" are in the form of crystals having a broad size distribution, which process comprises:

commingling said mixture with a solvent selected from the group consisting of water and acetic acid in an amount at least sufficient to dissolve substantially all of said "A" at the temperature for physical separation hereinafter described but not sufficient to dissolve all of said "B" at said temperature;

heating the resultant slurry of said mixture and said solvent to a temperature sufficient to dissolve at least about five times the amount of said "B" that will dissolve at the temperature for physical separation but not sufficient to dissolve all of said "B";

slowly cooling said slurry to deposit the dissolved portion of said "B" on the undissolved crystals of said "B" substantially without forming new crystals of said "B," the rate of such cooling being within the range of from about 0.05 to 5° F. per minute;

and thereafter physically separating a liquid phase containing solvent and said "A" from a solid phase containing said "B."

2. Process of claim 1 wherein said slurry is heated to a temperature effective to dissolve at least about seven times the amount of said "B" that will dissolve at the physical separation temperature.

3. Process of claim 1 wherein said physical separation is accomplished by filtration.

4. Process of claim 1 wherein said physical separation is accomplished by centrifugal force.

5. Process of claim 1 wherein said "A" is orthophthalic acid.

6. Process of claim 1 wherein said "B" is a mixture of isophthalic and terephthalic acids.

7. Process of claim 1 wherein said solvent is water.

References Cited in the file of this patent

UNITED STATES PATENTS

| 2,734,914 | McKinnis | Feb. 14, 1956 |
| 2,848,488 | Himel et al. | Aug. 19, 1958 |

OTHER REFERENCES

Perry et al.: Chemical Engineer's Handbook (3rd ed.), pages 1054–7, 1061. (Copy in Library.)